United States Patent [19]
Lee et al.

[11] 3,907,531
[45] Sept. 23, 1975

[54] AIR FILTER FOR AN OIL BURNER

[75] Inventors: Merle D. Lee; Lloyd R. Lee, both of Hackettstown, N.J.

[73] Assignee: The Raymond Lee Organization, Inc., New York, N.Y. ; a part interest

[22] Filed: Oct. 1, 1974

[21] Appl. No.: 511,094

[52] U.S. Cl. .................... 55/491; 55/500; 431/265
[51] Int. Cl.² ......................................... B01D 46/00
[58] Field of Search ............ 55/495, 500, 490, 501, 55/511, 509; 210/497; 128/142.6, 157, 165; 431/265

[56] References Cited
UNITED STATES PATENTS

| | | | |
|---|---|---|---|
| 1,182,404 | 5/1916 | Noguchi | 55/378 |
| 2,019,525 | 11/1935 | Dooley | 431/265 |
| 2,220,836 | 11/1940 | Closson | 128/165 |
| 2,712,313 | 7/1955 | Levy | 128/157 |
| 3,016,984 | 1/1962 | Getzin | 55/501 |
| 3,101,709 | 8/1963 | Gruenewaelder | 128/146.2 |
| 3,123,456 | 3/1964 | Boltz et al | 55/522 |
| 3,169,571 | 2/1965 | Madsen | 431/265 |
| 3,460,680 | 8/1969 | Domnick | 210/497 |

*Primary Examiner*—Bernard Nozick
*Attorney, Agent, or Firm*—Daniel Jay Tick

[57] ABSTRACT

An air filter for an oil burner comprises a strip of flexible air filtering material for cleaning air passing therethrough. Cords affixed to and extending from the ends of the strip are provided for tying the strip around an air intake of an oil burner over the openings therein thereby filtering air drawn into the oil burner.

1 Claim, 2 Drawing Figures

US Patent   Sept. 23,1975   3,907,531

AIR FILTER FOR AN OIL BURNER

DESCRIPTION OF THE INVENTION

The present invention relates to an air filter for an oil burner. More particularly, the invention relates to an air filter for an oil burner having a substantially cylindrical air intake having a plurality of openings therein for drawing air into the oil burner.

Objects of the invention are to provide an air filter of simple structure, which is inexpensive in manufacture, utilized with facility, convenience, comfort and rapidity on new and existing oil burners having substantially cylindrical air intakes having a plurality of openings therein for drawing air into the oil burner, which air filter functions efficiently, effectively and reliably to filter air drawn into such oil burners.

Figure 1:
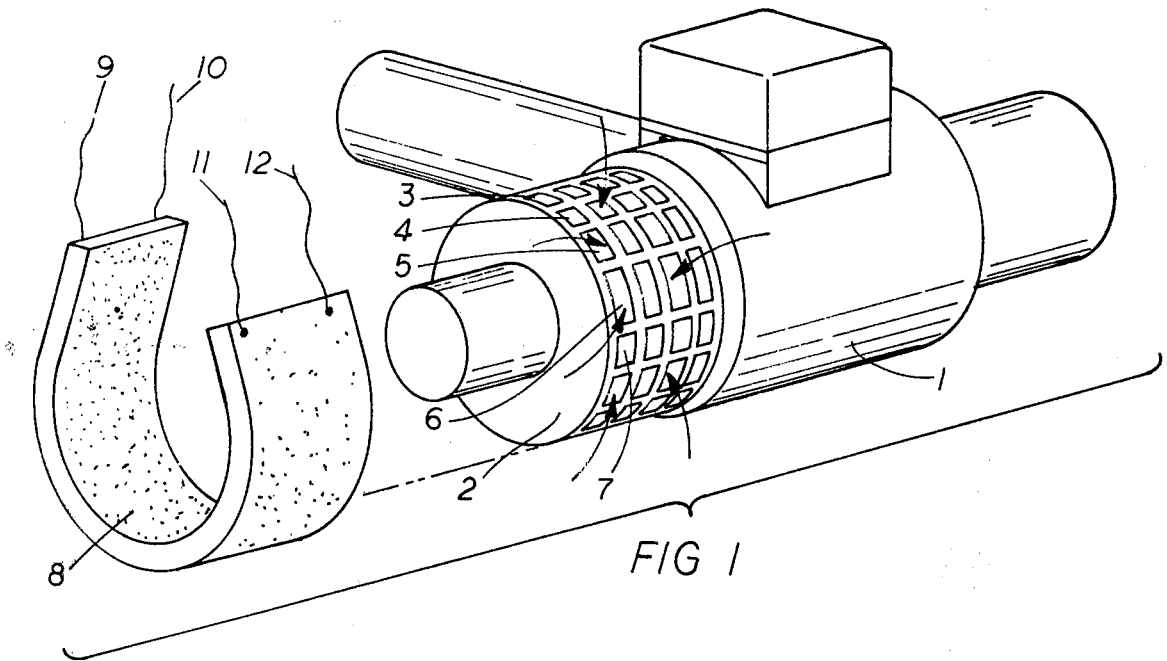
Figure 2:
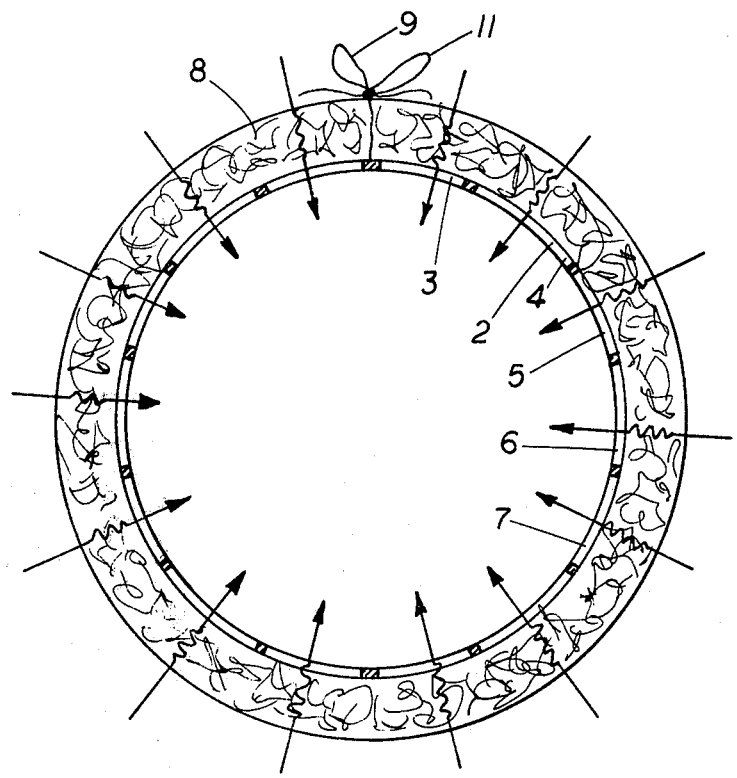

In order that the invention may be readily carried into effect, it will now be described with reference to the accompanying drawing, wherein:

FIG. 1 is a schematic diagram of an embodiment of the air filter of the invention in proximity with an oil burner having a substantially cylindrical air intake having a plurality of openings therein for drawing air into the boil burner; and FIG. 2 is a sectional view of the embodiment of FIG. 1 as mounted on the oil burner of FIG. 1.

In the FIGS., the same components are identified by the same reference numerals.

The air filter of the invention is for an oil burner 1 having a substantially cylindrical air intake 2 having a plurality of openings 3, 4, 5, 6, 7, and so on, therein for drawing air into the oil burner.

The air filter of the invention comprises a strip 8 of flexible air filtering material of any suitable type such as, for example, glass, wool, or the like, for cleaning air passing therethrough.

Cords or strings 9, 10, 11 and 12 are affixed to and extend from the ends of the strip 8. The cords 9 to 12 facilitate the tying of the strip 8 around an air intake of an oil burner 1 over the openings 3 to 7, and so on, therein thereby filtering air drawn into the oil burner.

While the invention has been described by means of a specific example and in a specific embodiment, we do not wish to be limited thereto, for obvious modifications will occur to those skilled in the art without departing from the spirit and scope of the invention.

We claim:

1. An air filter for an oil burner having a substantially cylindrical air intake having a plurality of openings therein for drawing air into the oil burner, said air filter comprising a strip of flexible air filtering material for cleaning air passing therethrough, said strip having spaced opposite ends with holes formed therethrough; and spaced cords affixed to and extending from each of the ends of the strip adjacent the sides thereof, said cords passing through the holes through the strip, tying the strip around an air intake of an oil burner over the openings therein thereby filtering air drawn into the oil burner.

* * * * *